Oct. 1, 1946.  H. L. MITCHELL  2,408,571
NAVIGATIONAL COMPUTING INSTRUMENT
Filed April 24, 1944   3 Sheets-Sheet 1

Inventor
Hubert L. Mitchell
E. V. Hardway,
Attorney

Oct. 1, 1946. H. L. MITCHELL 2,408,571
NAVIGATIONAL COMPUTING INSTRUMENT
Filed April 24, 1944 3 Sheets-Sheet 2
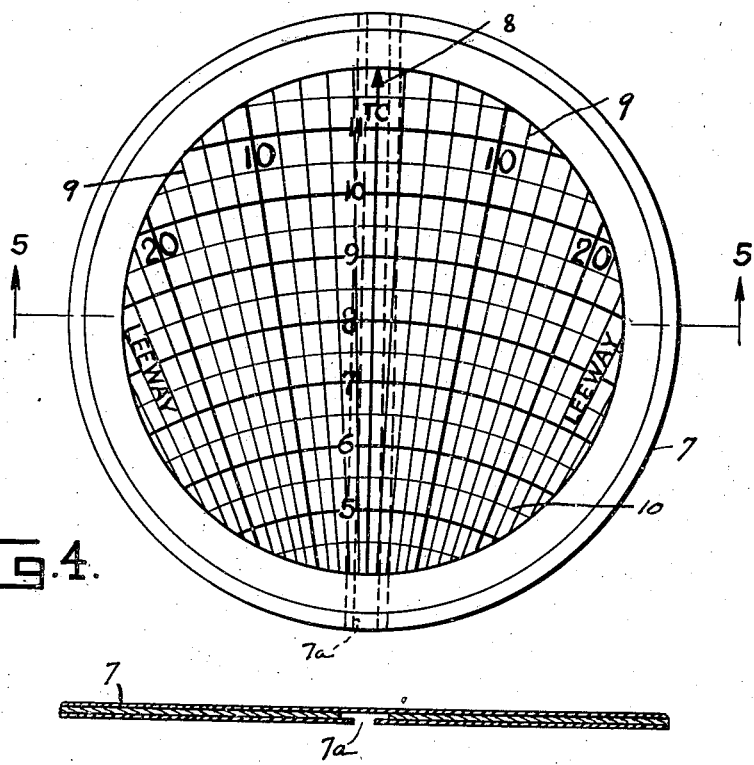
Fig.4.
Fig.5.
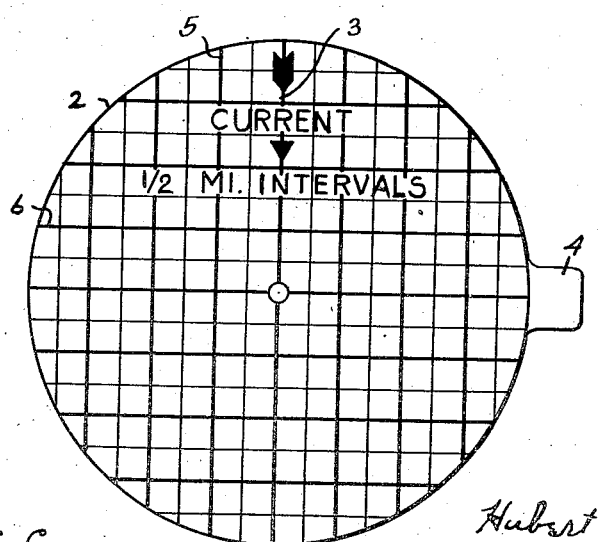
Fig.6.
Inventor
Hubert L. Mitchell
By
E. J. Hardway
Attorney

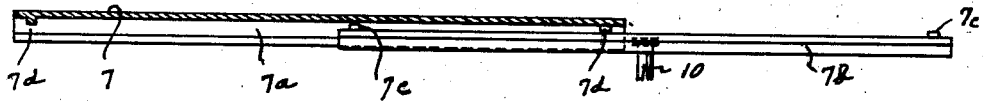
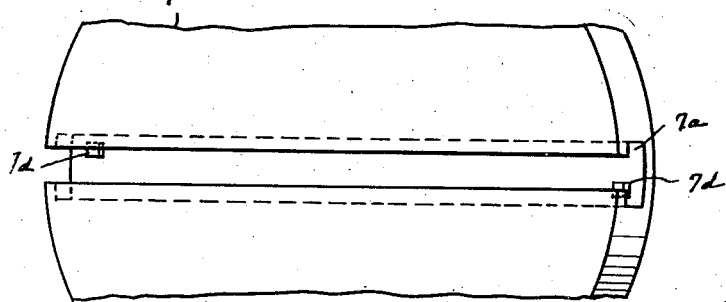
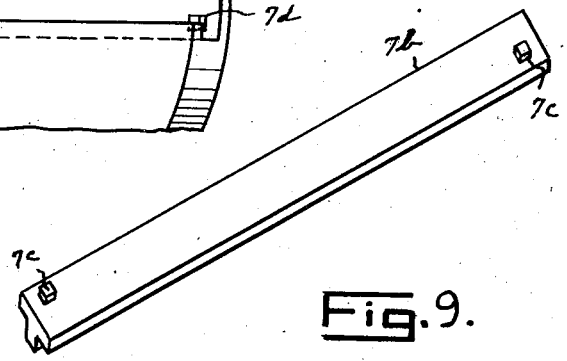

Patented Oct. 1, 1946

2,408,571

UNITED STATES PATENT OFFICE 2,408,571

NAVIGATIONAL COMPUTING INSTRUMENT

Hubert L. Mitchell, Houston, Tex.

Application April 24, 1944, Serial No. 532,519

3 Claims. (Cl. 33—1)

This invention relates to a computing instrument designed for use in navigation.

The invention herein described embodies certain improvements over the instrument disclosed in my copending application Serial Number 525,297, filed March 6, 1944.

An object of the invention is to provide an instrument formed with a navigational side which supplies convenient means for, at once, solving various angle problems, which replaces traverse tables, which ascertains the vessel's position from two angles, by means of which the true course, true heading, cruising speed, speed over bottom, leeway and force and direction of currents may be known; also which may be used as a conventional protractor, without the use of a straight edge.

As herein used the term "current" represents the sum of the effects of wind current and sea current; and "leeway" represents the number of degrees correction necessary to compensate for current.

The instrument herein disclosed is intended, in actual use, to be also provided with a slide rule side, as shown in the copending application and used to multiply, divide, find percentage, proportions, square roots, speed-time-distance relations, to convert miles per any given time unit to miles per any other time unit and to convert nautical and statute miles to determine fuel consumption.

More generally speaking the instrument has been designed for use in water navigation as an aid in making quick solutions of problems confronting the navigator and in obtaining the information required pertaining to the movements of the vessel; the instrument is also capable of use in air navigation by the necessary conversion of its unit-readings.

With the above and other objects in view this invention has particular relation to certain novel features of construction, operation and arrangement of parts, an example of which is given in this specification and illustrated in the accompanying drawings, wherein:

Figure 4 shows a plan view of the leeway grid.

Figure 5 shows a cross sectional view thereof, taken on the line 5—5 of Figure 4.

Figure 6 shows a plan view of the velocity current, or winddrift, grid.

Figure 7 shows an edge view of the track on which the leeway grid is mounted to slide, showing said grid adjusted to eccentric position relative thereto.

Figure 8 shows an enlarged, fragmentary bottom perspective view of the leeway grid.

Figure 9 shows a perspective view of the track, and

Figure 10 shows a simple form of chart illustrating the use of the instrument as a protractor.

Figure 1:
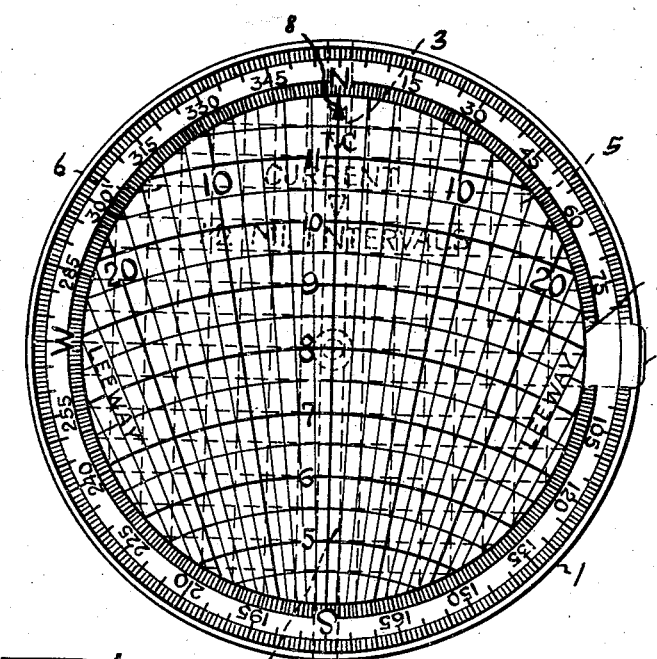
Figure 1 shows a plan view of the navigational side of the instrument.
Figure 2:
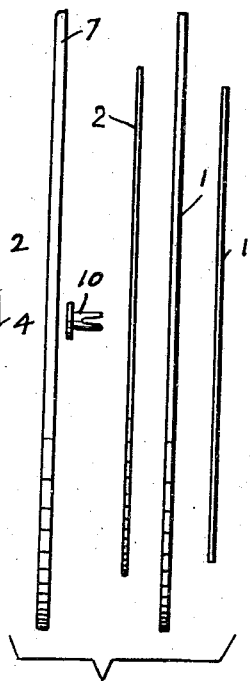
Figure 2 shows a diagrammatic edge view illustrating the relative positions of the instrument parts.
Figure 3:
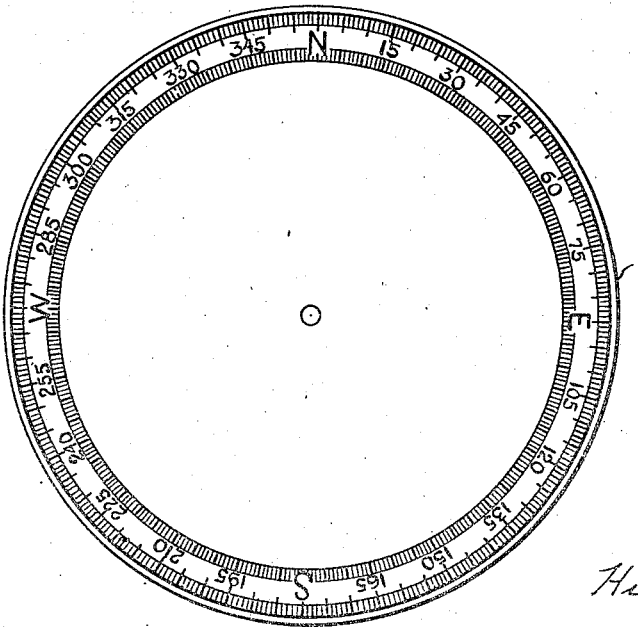
Figure 3 shows the compass rose.

Referring now more particularly to the drawings wherein like numerals of reference designate similar parts in each of the figures the numeral 1 designates a disc having a compass rose on one side. This part 1 is shown as a relatively thin disc but it may be of any selected shape or thickness.

There is a current velocity, or winddrift grid, 2 mounted to rotate on the disc 1 within the compass rose. It is provided with a current arrow 3 and a marginal shift tab 4. It also has spaced lines 5 which are parallel with the arrow. This arrow and its parallel lines, when the instrument is in use, point in the direction of the current. There are also the spaced lines 6, on this grid, at right angles to the arrow and which are used to measure the strength of the current.

It will be noted from an inspection of Figure 6 that the lines 5 and 6 are alternately heavy and light. Interval from a heavy to a light line represents current speed of one-half mile, and interval from a heavy line to the next heavy line represents current speed of one mile. For convenience in reading, the arrow and these lines should be of a bright color, preferably red.

There is also a leeway grid 7 marked in degrees. This is superimposed on the grid 2 and should be transparent so that the grid 2 will be visible through it. On it is the true course arrow 8 which should indicate the true course, if known; if not after reading degree of wind current from instrument will indicate true heading.

On the grid 7, to the right and left of the true course arrow 8 are uniformly spaced leeway lines 9 which converge to a center common to the lines and to the line of arrow 8, which center is remote from the grid. These lines are spaced apart to indicate two degrees between them. There are also arc lines 10, on grid 7, intersecting true course arrow, having a common center with the leeway lines 9, and spaced uniformly apart to represent cruising speed as well as speed over bottom. When the true course arrow 8 actually indicates the true course, the strength of the current is measured from the center in the reverse direction from that indicated by the arrow 3. When the true course arrow indicates true heading, the strength of the current is measured from the center in the direction indicated by the arrow 3.

In traverse, leeway error, vertical angle, bearing angle and sun's altitude problems, intervals on both grids 3 and 7 become units of proportion.

The leeway grid 7 is of considerable thickness and, for convenience may be three ply, as shown in Figure 5, with the ply securely glued, or otherwise fastened, together. This grid has a long dovetailed diametrical groove 7a, co-axial with the true course arrow 8 and the center of the grid. The leeway grid is mounted to slide on a track 7b and the upper face of the track is provided with the end lugs 7c, 7c arranged to interengage with cooperating lugs 7d, 7d located within, and arranged adjacent the ends of, the groove 7a so as to allow freedom of movement of the leeway grid in any direction but to prevent its detachment from the track.

The numeral 11 designates a disc which is designed to carry the index scale of the slide rule hereinabove referred to. The disc assembly is held together by a grommet as 10 whose head is attached to the track 7b, as shown in Figure 7 and this grommet passes centrally through the winddrift grid 2, the compass rose disc 1 and the disc 11 so that these discs may rotate, relative to each other, about a common center. Accordingly, the leeway grid may be rotated relative to the winddrift grid 2 or compass rose, or shifted in any desired radial direction relative to them.

As hereinbefore indicated, the instrument may be used for various purposes. For example, it may be used for charting a course. Assuming a vessel is to sail from a given point 12 on the chart, as shown on Figure 10 to another point as 13 shown on said figure, with cruising speed at 6 knots, against northeast current averaging 1 knot, variation being 15 degrees west. The problem is to find the compass course and the speed over the bottom. A line is drawn on the chart from the point of departure to the point of destination. The instrument is then placed on the chart so that its center coincides with the intersection of the line drawn as above stated with a meridian of longitude nearest midpoint between the point of departure and the point of destination. In the present illustration the 70 degrees 20 minutes meridian is used. The compass rose is now turned until N and S lie on the meridian. The true course is shown from the compass rose on the side nearest point of destination that is on the right hand side as being 99 degrees, the true bearing. The true course arrow of the leeway grid 7 is now turned to 99 degrees on the compass rose and the feather of the current arrow is set at 45 degrees on the compass rose since current is from the northeast.

From the center of the instrument two small intervals should be counted to the first heavy red line along current arrow 3 and toward the feather thereof. This interval should be counted since the current, of the problem in question, has a strength of one knot. The leeway grid 7 is now moved radially to a position where the 6 knot arc will intersect this point.

It will then be noted on leeway grid that there is an 8 degree correction shown at that point, the cruising speed being 6 knots. Between the last noted point and the true course arrow ascertain the number of degrees which in the present instance will be 8 degrees, to find leeway.

Since the current is from the left side of the true course arrow, in the present problem, subtract 8 degrees (leeway) from 99 degrees (true course) to find true heading of 91 degrees; then add 15 degrees (westerly variation) to 91 degrees true heading and this will give the magnetic course of 106 degrees. This becomes the compass course if deviation error is eliminated from the boat's compass.

On the true course arrow, at center of the instrument, note the speed over bottom, which will be 5.4 knots.

What I claim is:

1. An instrument of the character described comprising a compass rose, a current grid thereon having a diametrical course pointer, a track mounted to rotate on substantially a common axis with the current grid and compass rose, a leeway grid mounted to slide on said track radially with respect to and substantially entirely across the current grid and compass rose.

2. An instrument of the character described comprising a compass rose, a current grid thereon, a track extended entirely across the compass rose and mounted to rotate on substantially a common axis with the current grid and compass rose, a leeway grid mounted to slide substantially from end to end of said track and means for preventing detachment of the leeway grid from the track.

3. An instrument of the character described comprising a compass rose, a current grid mounted to rotate thereon, a track, dovetailed in cross section, and mounted to rotate on substantially a common axis with the current grid and compass rose, a leeway grid of approximately the same transverse diameter as the compass rose and having a transverse dovetailed groove which receives said track, said leeway grid being slidable on the track substantially entirely across the current grid and compass rose.

HUBERT L. MITCHELL.